United States Patent [19]

Medlicott

[11] Patent Number: 4,821,599
[45] Date of Patent: Apr. 18, 1989

[54] ENERGY STORAGE FLYWHEEL

[75] Inventor: Philip A. C. Medlicott, Pryford, England

[73] Assignee: British Petroleum Company p.l.c., London, England

[21] Appl. No.: 97,310

[22] Filed: Sep. 14, 1987

Related U.S. Application Data

[63] Continuation of Ser. No. 662,073, Oct. 18, 1984, abandoned.

[30] Foreign Application Priority Data

Oct. 22, 1983 [GB] United Kingdom ............... 8328295

[51] Int. Cl.⁴ ............................................. F16F 15/30
[52] U.S. Cl. ................................................. 74/572
[58] Field of Search ............................. 74/572; 416/60

[56] References Cited

U.S. PATENT DOCUMENTS

| | | | |
|---|---|---|---|
| 422,606 | 3/1890 | Mitchell | 74/572 X |
| 1,165,919 | 12/1915 | Turner | 74/572 |
| 1,265,899 | 5/1918 | Forster | 74/572 |
| 1,451,818 | 4/1923 | Forster | 74/572 |
| 3,296,886 | 1/1967 | Reinhart | 74/572 |
| 3,788,162 | 1/1975 | Rabenhorst et al. | 74/572 |
| 4,080,845 | 3/1978 | Hatch | 74/572 |
| 4,102,221 | 7/1978 | Hatch | 74/572 |
| 4,176,563 | 12/1979 | Younger | 74/572 |
| 4,207,778 | 6/1980 | Hatch | 74/572 |
| 4,241,620 | 12/1980 | Pichl et al. | 74/572 |
| 4,289,251 | 8/1981 | Swartout | 74/572 |
| 4,341,001 | 7/1982 | Swartout | 74/572 X |
| 4,370,899 | 2/1983 | Swartout | 74/572 |
| 4,660,435 | 4/1987 | Davis et al. | 74/572 |

FOREIGN PATENT DOCUMENTS

| | | | |
|---|---|---|---|
| 0030548 | 2/1983 | Japan | 74/572 |
| SU846889B | 7/1981 | U.S.S.R. | |

Primary Examiner—John Rivell
Attorney, Agent, or Firm—Morgan & Finnegan

[57] ABSTRACT

A flywheel comprising a rim (1) which is a substantially circular ring mounted on a central portion (2) which central portion comprises at least one substantially circular dished member which has a specific modulus which is less than the specific modulus of the rim, the dished member being curved such that increasing rotational speed tends to elastically deform the dished member, straightening the curve, thereby increasing the diameter of the dished member. In a preferred embodiment, the central portion (2) comprises at least two co-axial dished members (3,4) which are imperforate apart from a central hole (5), each dished member comprising three integrally formed annular portions, two of the portions (6,8) being curved and being positioned on each side of the third portion which is straight or curved.

16 Claims, 4 Drawing Sheets

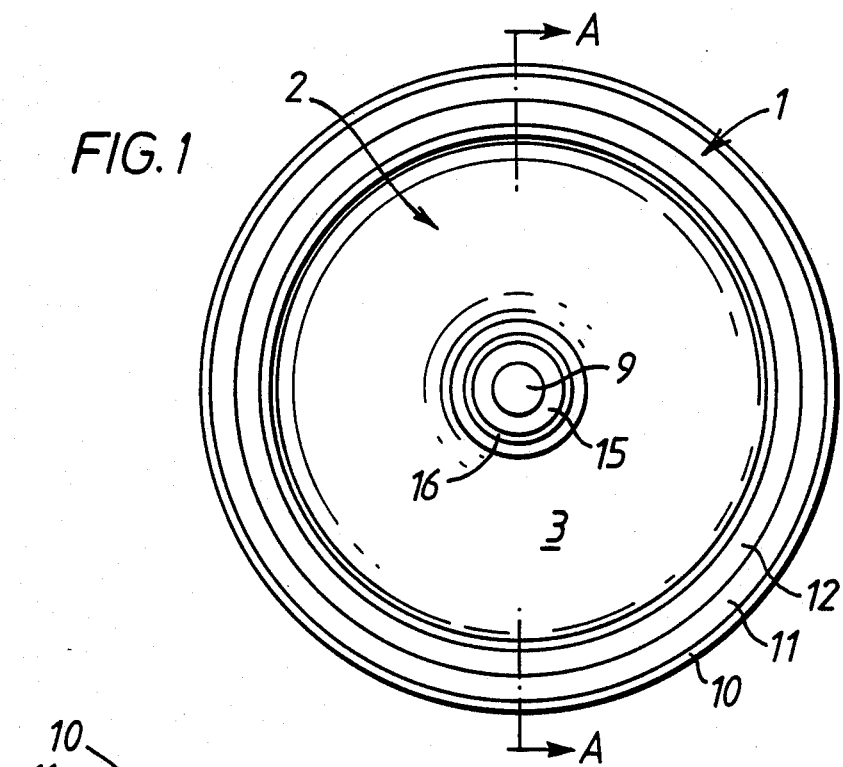
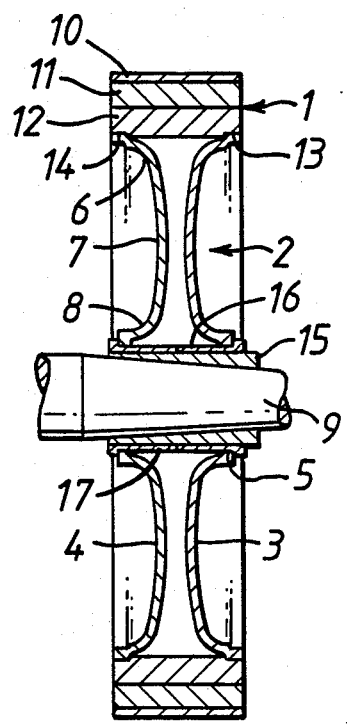

ENERGY STORAGE FLYWHEEL

This is a continuation of co-pending application Ser. No. 662,073, filed on Oct. 18, 1984, now abandoned.

This invention relates to energy storage flywheels.

The ability of flywheels to accept and discharge energy over relatively short periods of time has been known for many years and energy storage flywheels have been used, or proposed for use, in a variety of applications. One application which has received increasing attention in recent years is the use of a flywheel as a means of storing kinetic energy in motor vehicles.

The amount of energy stored in a flywheel is dependent upon the mass of the flywheel and its rotational speed. The maximum amount of energy which can be stored is limited by the materials of construction and the manner in which the stresses which are created are distributed within the flywheel. Metals, which have traditionally been used for the manufacture of flywheels, are not as suitable for flywheels which are required to store relatively large amounts of energy in a relatively small space. The mass of a metal flywheel and of the necessary containment for the flywheel could negate the advantage of using such an energy storage system in a vehicle. Preferably therefore the material of construction for a compact, high speed flywheel has a lower density than metal but is at least as strong. Suitable materials are fibre composite materials.

It is known that mass located towards the outer radius of a flywheel contributes more to the energy storage than mass located towards the centre of the flywheel. Thus a suitable flywheel construction is known to comprise a rim which has a relatively high mass mounted on a relatively low mass central portion which is capable of transferring the torque from the hub to the rim and vice versa. The central portion may, for example, be a disc or a spider comprising a central hub with radiating spokes.

The construction of such a flywheel from fibre composite materials particularly glass fibre composite materials, presents certain difficulties. Energy storage flywheels, particularly those flywheels constructed from low density materials such as fibre composites, are required to operate at very high rotational speeds in order to obtain high energy densities. The centrifugal forces acting on a flywheel rotating at high speed result in a certain amount of growth in the radial direction. This means that the forces, which increase with increasing radial distance from the centre of rotation tend to cause the rim to separate from the central portion of the flywheel.

A number of methods have been proposed for overcoming this problem. For example, U.S. Pat. No. 4,266,442 discloses a flywheel comprising a rim which is a circular ring mounted on a central disc portion, the inner radius of the rim being smaller than the outer radius of the disc such that there is an interference fit between the rim and the disc of at least 0.001 inch per inch of radius from the centre of the disc to the outer periphery of the rim when the flywheel is at rest. In order to fit the rim onto the disc it is necessary to increase the inner radius of the rim and/or to decrease the radius of the disc. The patent discloses a method of making such a flywheel which comprises radially shrinking the flywheel disc by cooling it to a low temperature e.g. 4° K, fitting the rim over the shrunken disc and then expanding the disc to give the required interference fit.

The flywheel according to the present invention overcomes or at least mitigates the problem of separation of the rim and central portion at high rotational speeds. The flywheels according to the invention do not require a large interference fit between the central portion and the rim when the flywheel is at rest and may be assembled without the need to thermally shrink the central portion or to expand the rim.

According to the present invention a flywheel comprising a rim which is a substantially circular ring, mounted on a central portion is characterised in that the central portion comprises at least one substantially circular dished member which has a specific modulus which is less than the specific modulus of the rim, the dished member being curved such that increasing rotational speed tends to elastically deform the dished member, straightening the curve, thereby increasing the diameter of the dished member.

Preferably, the central portion of a flywheel according to the present invention comprises two or more co-axial dished members. Generally, an even number of dished members will be used. The two or more members may be integrally formed but are preferably separate components. The dished members are preferably annular and are preferably imperforate apart from the central hole.

The dished members may comprise a single curve or a plurality of curves. Preferably, however, the dished members comprise three integrally formed portions at least two of which are curved. Thus according to a preferred embodiment of the present invention a flywheel comprising a rim, which is a substantially circular ring, mounted on a central portion is charaterised in that the central portion comprises at least one substantially circular dished member which has a central hole and has a specific modulus which is less than the specific modulus of the rim, the dished member comprising three integrally formed annular portions, two of the portions being curved and being positioned on each side of the third portion which is curved or straight, the radii of the curved portions being such that the diameter of the dished member tends to increase with increasing rotational speed.

The dished members of flywheels according to the preferred embodiment of the present invention may comprise two curved portions, separated by a straight portion, i.e. a portion having an infinite radius. Preferably, however, the dished members comprise three curved portions, i.e. each portion has a finite radius, and in this specification the three portions of the dished members will be referred to as 'curved portions'.

In this specification references to the radii of the curved portions refer to the radii of curvature of these portions and not to their radial position in the circular plane of the dished members. The radii are measured to a position midway through the sectional thickness of the material of the dished members. The curved portions will generally be arcs of circles. However, the curved portions may be non-circular curves. If a curve of the curved portions is an ellipsoidal, parabolic or hyperbolic arc, references to the radius of the curved portion should be taken to mean half of the sum of the distances from the focus to each end of the arc.

The specific modulus of each of the dished members of a flywheel according to the invention, i.e. the ratio of the in-plane modulus of the dished member to the density of the material of construction of the dished member, is preferably from 25% to 70% of the specific modulus of the rim of the flywheel, i.e. the ratio of the circumferential modulus of the rim to the density of the material of construction of the rim.

For convenience, the invention will be described with reference to the accompanying drawings FIGS. 1 to 8 which illustrate a number of embodiments of the invention. However, the invention should not be taken as being limited to these embodiments.

FIG. 1 is a plan view of a flywheel according to the present invention.

FIG. 2 is a sectional view of the flywheel illustrated in FIG. 1, taken along line A—A.

Figure 3:
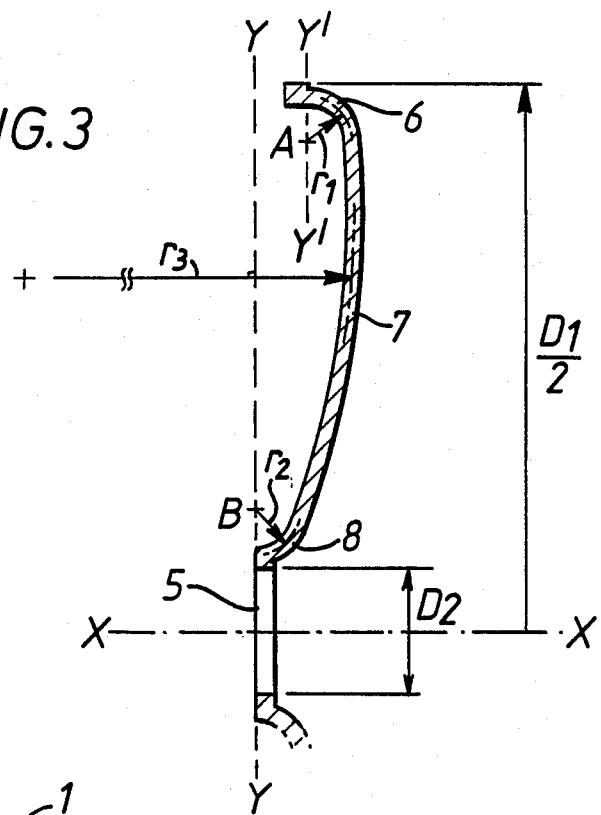
FIG. 3 is a sectional view of part of a dished member illustrated on a larger scale.

The general features of a flywheel according to the present invention will be described with reference to FIGS. 1 to 3.

The flywheel illustrated in FIGS. 1 and 2 comprises a rim (1), which is a substantially circular ring, mounted on a central portion (2). The central portion (2) comprises two co-axial, substantially circular dished members (3,4), each of which has a central hole (5) and comprises three integrally formed curved portions (6,7,8). In this embodiment, all three of the curved portions (6,7,8) are curved in the same direction. All of the curves are arcs of circles, but as indicated above, the curves may be non-circular.

FIG. 3 is a sectional view of part of a dished member drawn on a larger scale. The dished member has a similar general shape to the dished members of FIG. 2 and the figure illustrates the geometry of the dished members in greater detail.

Preferably, the dished members (3,4) have two annular curved portions which have radii smaller than the third curved portion, the curved portion having the larger radius being positioned between the curved portions of smaller radii. Thus, the dished members (3,4) illustrated in FIGS. 1 to 3 have an annular curved portion (6) with a radius, $r_1$, adjacent the periphery of the dished member and an annular curved portion (8) with a radius, $r_2$, adjacent the central hole (5) in the dished members; the radii $r_1$ and $r_2$ being substantially less than the radius $r_3$ of the annular curved portion 7 which is positioned between curved portions 6 and 8. The radii ($r_1$, $r_2$, $r_3$) are measured to a position midwaythrough the sectional thickness of the material of the dished members, as shown in FIG. 3.

The radii ($r_1$,$r_2$) of the curved portions (6,8) adjacent the periphery and the central hole of the dished member may be the same or different and are preferably in the range from 0.02 to 0.2 times the diameter of the dished member ($D_1$). Preferably, the radius ($r_2$) of the curved portion (8) adjacent the central hole (5) is not less than and is typically not more than 3 times the radius ($r_1$) of the curved portion (6) adjacent the periphery of the dished member. The radius ($r_3$) of the third curved portion (7) is preferably in the range from 0.3 to 1.0 times the diameter of the dished member ($D_1$).

The periphery of a dished member may tend to move axially when the dished member is rotated at varying speed in the absence of a rim. The extent and direction of this axial movement is determined, inter alia, by the relative positions of the centre of curvature (A) of the curved portion (6) adjacent the periphery of the dished member and the centre of curvature (B) of the curved portion (8) adjacent the central hole (5) in the dished member. The centres of curvature (A,B) may both lie on the same plane which plane is perpendicular to the rotational axis of the flywheel. Preferably, however, the centres of curvature (A,B) lie on different, planes, which planes are perpendicular to the rotational axis of the flywheel.

In FIG. 2, the centres of curvature (not shown) of the curved portions 6 and 8 lie on the same plane. In FIG. 3, line X—X is the rotational axis of the flywheel and line Y—Y indicates a plane perpendicular to this rotational axis. The centre of curvature (B) of the curved portion (8) adjacent the central hole (5) lies on this plane, Y—Y, but the centre of curvatture (A) of the curved portion (6) adjacent the periphery of the dished member lies on a different plane indicated by a line Y'—Y' in FIG. 3. Plane Y'—Y' could be on either side of plane Y—Y. In FIG. 3, plane Y'—Y' is shown on the right of the plane Y—Y.

An axial displacement of the centres of curvature (A,B) may be used to provide a small net compressive axial force between the dished members (3,4) and the rim (1). Although such a compressive force may be useful, it is necessary to compromise between the benefit obtained by the compressive force and the effect of the additional bending stresses which may be produced within the dished members.

For a flywheel such as that shown in FIGS. 1 to 3, which has dished members having curved portions with radii within the above mentioned ratios, the applicants have found that the space between the planes Y—Y and $Y^1$—$Y^1$ i.e. the axial displacement of the centres of curvature (A,B) is of the order of $(0.81 \times r_2 - 0.7 \times r_1)$.

The diameter $D_2$ of the central hole (5) in the dished members is selected to enable the flywheel to be mounted on a shaft (9) passing through the central holes of the dished members. The radial stiffness of the dished member is affected by the ratio of the diameter of the central hole ($D_2$) to the diameter of the dished member ($D_1$). Typically, this ratio is from 0.2 to 0.6.

The cross-sectional thickness of the dished members (3,4) is preferably substantially constant. However, a greater thickness of material may be used around the central hole (5) to facilitate the attachment of the flywheel to a shaft (9). Also additional mass may be provided at the periphery of the dished members to provide an additional force acting radially outwards when the flywheel is rotating. This additional force may assist the increase in the radius ($R_1$) of the dished members when the flywheel is rotated at high speed.

In order to be effective, the dished members (3,4) should be stiff enough to transfer torque from the rotatable shaft (9) to the rim (1) and vice versa while at the same time being sufficiently flexible in the radial direction to allow the diameter ($D_1$) of the dished members to increase with increasing rotational speed thereby enabling the central portion (2) to remain in contact with the rim (1) over the range of operating speeds of the flywheel. This balance of stiffness and flexibility is achieved by the selection of the shape and dimensions of the dished members (3,4).

The actual dimensions of any particular shape of the dished members (3,4) may be selected according to known engineering principles using for example, finite element analysis.

The curved portions (6,7,8) impart sufficient flexibility in the dished members (3,4) to enable the diameter ($D_1$) of the dished members to increase with increasing rotational speed. When not confined by the rim (1), the dished members (3,4) should be capable of an increase in diameter ($D_1$) which is at least equal to the increase in the inner diameter of the rim (1) at the maximum design speed of the flywheel. Preferably, the dished members (3,4) are capable of an increase in diameter ($D_1$) which is from 1.15 to 2 times the expected increase in the inner diameter of the rim when rotated at the maximum speed at which the flywheel is to be used. The actual increase in the diameter ($D_1$) of the dished members (3,4) will be constrained by the rim (1) which is more radially stiff than the dished members (3,4). The additional capacity for an increase in the diameter ($D_1$) provides a safety factor.

For any particular diameter ($D_1$) of the dished members (3,4), when measured at rest, an increase in the radii ($r_1$ and $r_2$) of one or both of the curved portions 6 and 8 and a corresponding reduction in the radius ($r_3$) of the curved portion 7 tends to increase the flexibility of the dished members (3,4) and hence increase the amount by which the diameter ($D_1$) is increased at any particular speed of rotation. An increase in the radius $r_2$ tends to increase the axial stiffness of the dished member.

The dished members (3,4) are preferably manufactured from high strenth fibres bonded in a matrix material. Suitable high strength fibres include aramid fibres, carbon fibres, or glass fibres. Suitable glass fibres include the low alkali borosilicate glass fibres known as E glass. Suitable matrix materials include epoxy resins and polyester resins. Preferably the fibres are in the form of a woven or knitted cloth having good drapability. The cloth preferably has substantially equal physical properties in both the warp and weft directions.

A suitable method of manufacturing the dished members is the resin injection moulding technique. A plurality of layers of the fibres are laid out in a mould and the mould closed. The matrix material is then injected into the mould filling the voids without substantially displacing the fibres. Injection is stopped when the mould is full and the matrix material is then allowed to cure. The dished members preferably have quasi-isotropic properties and so the fibres are preferably arranged in the mould in layers in such a way that the bulk of the fibres of each layer are at an angle to the bulk of the fibres of adjacent layers. An alternative method of manufacturing the dished members is to use prepregnated fibres or cloth, i.e. high strength fibres or cloth woven or knitted from such fibres, which are impregnated with the matrix material. The prepregnated fibres or cloth are laid up in a mould and then cured in an autoclave. Preferably the composite material from which the dished members 3 and 4 are made comprises from 40 to 60% by volume of high tensile strength fibres.

The rim (1) is substantially circular and may, as shown in FIGS. 1 and 2, comprise a plurality of layers (10,11,12). The rim (1) is preferably constructed from fibres wound circumferentially and bonded in a suitable matrix material. Suitable materials include, carbon, aramid or glass fibres in epoxy resin or polyester resin. Metal wires e.g. steel wires, bonded in a suitable matrix material may also be suitable. If the rim (1) comprises a plurality of layers then the inner layers preferably have a lower specific modulus than the outer layers so that the radii of the inner layers will tend to increase more than the radii of the outer layers when the flywheel is rotating at a high speed. This arrangement resists separation of the layers at high rotational speed. When the flywheel is at rest, the ratio of the inner radius to the outer radius of the annular rim is preferably from 0.60:1 to 0.85:1.

The rim (1) and central portion (2) may be manufactured such that the central portion (2) is a sliding fit with the rim (1). Alternatively, the central portion may be a tight fit with the rim i.e. there may be a small interference fit between the central portion (2) and the rim. Preferably, the diameter ($D_1$) of the dished members of the central portion (2) is from 0.01% smaller to 0.05% larger than the internal diameter of the rim when the flywheel is at rest. If the central portion (2) has a diameter ($D_1$) which is initially less than the internal diameter of the rim then means for fixing the central portion to the rim is required. Mechanical fasteners are not used to attach the rim and central portion because such means of attachment may result in undesirable stress concentrations. A suitable means of fixing is to use an adhesive such as for example a touoghened epoxy resin adhesive. If the diameter ($D_1$) of the central portion is not less than the internal diameter of the rim (1), than an attachment means such as an adhesive joint may not be required. The flywheels according to the present invention do not require a large interference fit and so the flywheels may be assembled without substantially distorting the rim or the central portion and without creating unacceptable levels of stress in the assembled flywheel. A relatively small temperature difference, e.g. 20° to 30° C., between the rim (1) and the central portion (2) may be used to facilitate assembly. An axial load may be applied around the central hole (5) of the dished members (3,4) on assembly in order to pre-stress the dished members.

When the flywheel is rotated at increasing speed, the whole flywheel expands radially and the inner diameter of the rim increases. The centrifugal forces acting on the dished members (3,4) cause the diameter ($D_1$) of the central portion (2) to increase by elastically deforming the dished members (3,4). The diameter ($D_1$) of the dished members (3,4) is varied by increases or decreases in the radii of the curved portions (6,7,8). This increase in the diameter ($D_1$) of the dished members (3,4) due to the elastic deformation of the dished members (3,4) keeps the central portion (2) in contact with the rim. The dished portions (3,4) are less stiff than the rim (1) and so the forces acting on the dished portions (3,4) to urge them against the inner surface of the rim are not sufficient to substantially deform the rim. The shape of the dished members is selected so as to minimise any increase in the diameter ($D_2$) of the central hole (5) in the dished members (3,4) when the flywheel is rotated at increasing speed.

The central portion (2) of a flywheel according to the present invention is not attached to the rim (1) by means of a mechanical fastener because such a means of attachment may result in undesirable stress concentrations. However, a force, other than a force acting in a radial direction, which is applied to a flywheel of the present invention, may cause the dished members to slip on the inner surface of the rim. Displacement of the dished members with respect to the rim could cause the flywheel to become unbalanced. A mechanical interlock may therefore be provided between the rim (1) and the dished members (3,4). The mechanical interlock should restrict axial movement of the rim with respect to the dished members while not interfering with their radial movement.

A suitable mechanical interlock is illustrated in FIG. 2 and simply comprises two recesses (13,14) in the inner surface of the rim with which the outer edges of the dished portions are engaged. If the rim is made of a fibre composite material the recesses (13,14) are preferably formed during the manufacture of the rim rather than being cut out of the produced article.

Any suitable means may be employed for mounting the flywheel on a rotatable shaft passing throught the co-axial central holes in the dished members (3,4). The flywheel may, for example, be clamped to the shaft using suitable retaining means. As well as, or instead of, clamping the flywheel to the shaft, an interference fit may be used to secure the flywheel to the shaft.

The flywheel illustrated in FIGS. 1 and 2 is mounted on the rotatable shaft (9) using a sleeve (15) and collars (16, 17). The sleeve (15) may be an axially slotted cylinder which has an axially tapered bore corresponding to a tapered portion of the shaft (9). Each of the collars (16, 17) comprises a cylinder the outer surface of which engages the dished members (3,4). The collars (16,17) may have recesses or other forms of mechanical interlock capable of engaging with and resisting axial movement of the dished members (3,4). Assembling the components and driving the sleeve (15) up the tapered shaft (9) secures the flywheel to the shaft.

Figure 7:
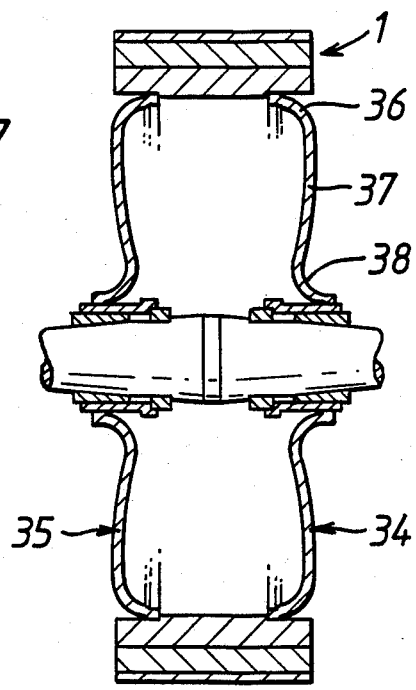
Figure 8:
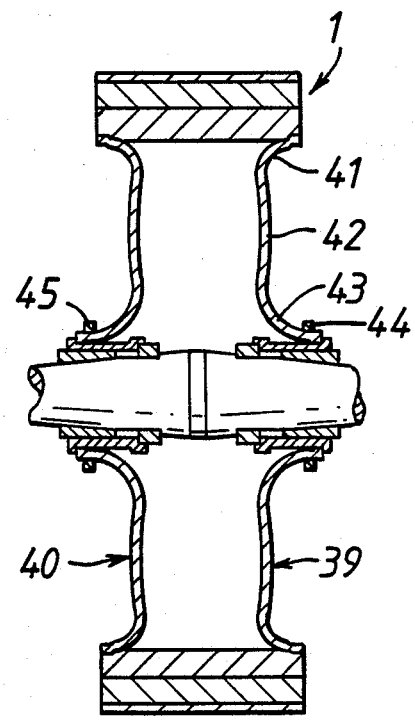

FIGS. 4 to 8 are sectional views of alternative embodiments of the flywheel according to the present invention. The flywheels of FIGS. 4 to 6 have dished members with a similar general shape to the dished members of the flywheel illustrated in FIGS. 1 and 2. FIGS. 7 and 8 illustrate flywheels having dished members with alternative shapes.

Figure 4:
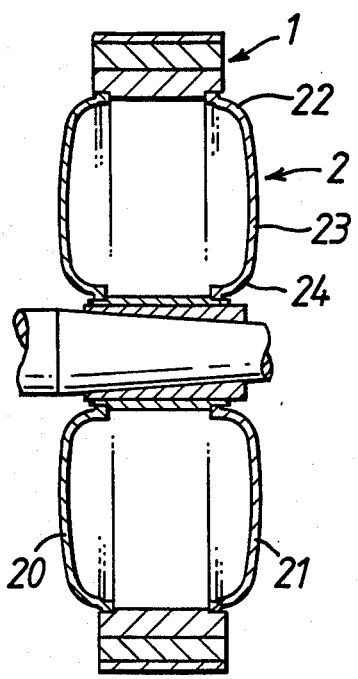
FIGS. 4 to 8 are sectional views of alternative embodiments of a flywheel according to the present invention.

The flywheel illustrated in FIG. 4 is similar to the flywheel of FIGS. 1 and 2 in that it comprises a multi layered rim (1) mounted on a central portion (2). The central portion (2) comprises two dished members (20,21) each of which comprises three annular curved portions (22,23,24). All of the curved portions are curved in the same direction and are arcs of circles. The dished members (20,21) are positioned witth their substantially concave surfaces adjacent rather than having their substantially convex surfaces adjacent as in FIG. 2. Although, the dished members (20,21) of FIG. 4 are similar to the dished members (3,4) of FIG. 2, they are likely to have a different axial displacement of the centres of curvature of the curved portions 22 and 24.

Figure 5:
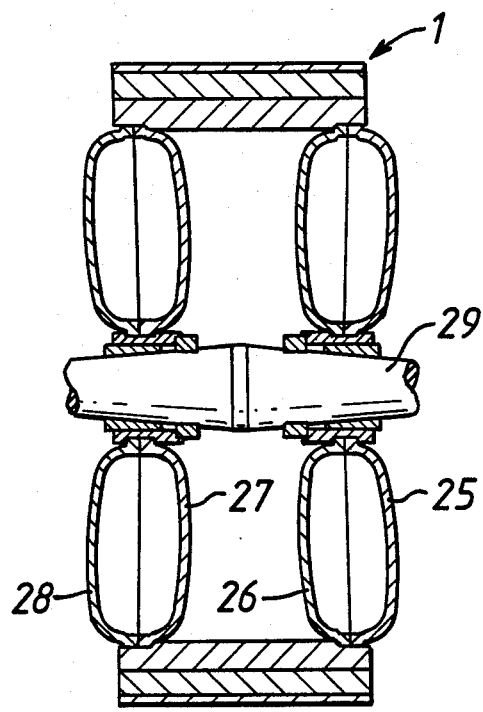
Figure 6:
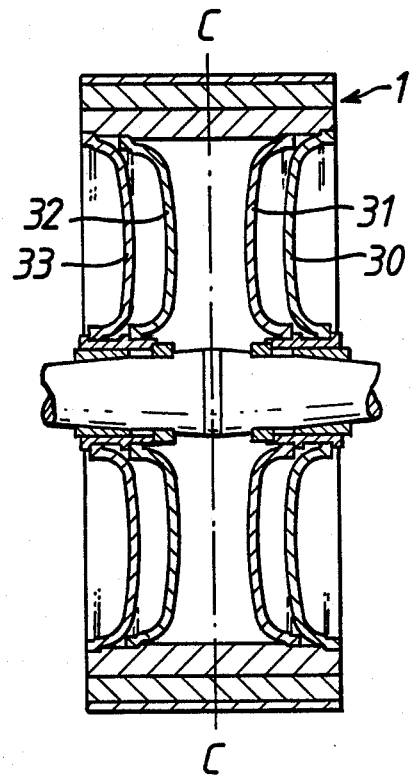

FIG. 5 is a sectional view of a flywheel which uses four dished members (25,26,27,28) to support the multi-layered rim (1). Each of the dished members has a similar general shape to the dished members illustrated in FIGS. 2 and 4. The dished members (25,26,27,28) are arranged in pairs, such that the substantially concave surfaces of each pair are adjacent. The rotatable shaft (29) has two tapered portions for ease of assembly.

FIG. 6 again shows four dished members (30,31,32,33) arranged in pairs to support a multi-layered rim (1). However, in this embodiment each of the dished members is positioned with its substantially convex surface directed towards the centre line C—C of the flywheel.

Flywheels having only two dished members such as those illustrated in FIGS. 2 and 4 have the advantage of simplicity. The use of more than two dished members provides additional support for the rim.

The flywheel illustrated in FIG. 7 uses two dished members (34,35) which comprise three curved portions (36,37,38), two of which curved portions (36,37) are curved is the same direction and the third (38) is curved in the opposite direction. The curved portions (36,37,38) are all arcs of circles. The radii of curved portions 36 and 38 are approximately equal and are substantially less than the radius of curved portion 37.

For a flywheel having dished members of the general shape shown in FIG. 7 and having curved portions with radii within the ratios given hereinbefore, the applicants have found that the axial displacement of the centres of curvature of the curved portions (36,38) is of the order of $(0.9 \times r_2 + 0.81 \, r_1)$.

The flywheel illustrated in FIG. 8 uses two dished members (39,40) each of which comprises three annular curved portions (41,42,43). Like the dished members of the flywheel illustrated in FIG. 7, two of the curved portions (41,43) are curved in the same direction while the third (42) is curved in the opposite direction. All of the curved portions are arcs of circles. The radii of curved portions 41 and 43 are substantially smaller than the radius of the third curved portion 42, the radius of curved portion 43 being somewhat larger than the radius of curved portion 41.

For a flywheel having dished members of the general shape shown in FIG. 8 and having curved portions with radii within the ratios given hereinbefore, the applicants have found that the axial displacement of the centres of curvature of the curved portions (41,43) is of the order of $(0.98 \, r_2 - 0.94 \, r_1)$.

Reinforcing rings (44,45) are shown positioned around the dished members (39,40) adjacent the central hole in each dished member. Such rings may be used to improve the hoop strength around the central hole (5) in the dished members (39,40) and may assist in securing the flywheel to the rotatable shaft. The reinforcing rings (44,45) suitably comprise circumferentially wound high strenth fibres bonded in matrix material. Suitable fibres include aramid, carbon and glass fibres and suitable matrix materials include epoxy and polyester resins. The rings may be separately formed and positioned on assembly of the flywheel or may be an integrally formed part of the dished members. If the rings (44,45) are separately formed, they may be attached to the dished members using any suitable method, e.g. an interference fit. An adhesive joint may be used to fix the rings in position. Reinforcing rings may be used with any of the flywheels according to the present invention.

Although all of the illustrated embodiments have dished members comprising three curved portions, the dished members may, as indicated hereinbefore, have two curved portions on each side of a straight portion, i.e. a portion of infinite radius. Thus, in the accompanying drawings dished members having the same general shapes as shown may have straight portions i.e. portions 7,23,37 and 42 may be straight.

I claim:

1. A flywheel comprising a rim which is a substantially circular ring mounted on a central portion, the central portion comprising at least one substantially circular solid disc which is imperforate except for a central hole and which comprises three integrally formed annular portions, two of the portions being curved and being positioned on each side of the third annular portion, the radii of the curved portions being such that the diameter of the solid disc tends to increase with increasing rotational speed and the specific modulus of the solid disc being less than the specific modulus of the rim.

2. A flywheel as in claim 1 in which the central portion of the flywheel comprises two or more coaxial, solid discs.

3. A flywheel as in claim 1 in which each solid disc comprises three integrally formed annular curved portions.

4. A flywheel as in claim 3 in which the curves of the curved portions are arcs of circles.

5. A flywheel as in claim 1 in which the specific modulus of each of the solid discs is from 25 to 70% of the specific modulus of the rim.

6. A flywheel as in claim 1 in which each solid disc comprises two annular curved portions having radii smaller than the radius of the third annular curved portion positioned between the curved portions of smaller radii.

7. A flywheel as in claim 6 in which the radii of the two curved portions having the smaller radii are the same or different and are from 0.002 times the diameter of the solid disc.

8. A flywheel as in claim 6 in which the radius of the curved portion having the larger radius is from 0.3 to 1.0 times the diameter of the solid disc.

9. A flywheel as in claim 7 in which the radius of the curved portion having the larger radius is from 0.3 to 1.0 times the diameter of the solid disc.

10. A flywheel as in claim 1 in which the radius ($r_2$) of the curved portio adjacent the central hole of the solid disc is from 1 to 3 times the radius ($r_1$) of the curved portion adjacent the periphery of the solid disc.

11. A flywheel as in claim 1 in which the center of curvature of the curved portion adjacent the periphery of the solid disc and the center of curvature of the curved portion adjacent the central hole of the solid disc lie on different planes, which planes are pependicular to the rotational axis of the flywheel.

12. A flywheel as in claim 1 in which the ratio of the diameter of the central hole in the solid discs to the diameter of the solid discs is from 0.2 to 0.6.

13. A flywheel as in claim 1 in which the diameter of the solid disc is from 0.01% smaller to 0.05% larger than the internal diameter of the rim.

14. A flywheel as in claim 1 in which the central portion is fixed to the rim using an adhesive joint.

15. A flywheel as in claim 1 in which the ratio of the inner radius of the rim to the outer radius of the rim is from 0.6:1 to 0.85:1.

16. A flywheel as in claim 1 in which the third annular portion is straight.

* * * * *